United States Patent [19]

Fischetti et al.

[11] Patent Number: 4,789,907
[45] Date of Patent: Dec. 6, 1988

[54] VIDEO CASSETTE RECORDING AND/OR VIEWING VENDING SYSTEM

[76] Inventors: Peter Fischetti, 569 Congress St.; John E. Swantek, III, 611 Pawling Ave., both of Troy, N.Y. 12180

[21] Appl. No.: 919,188

[22] Filed: Oct. 15, 1986

Related U.S. Application Data

[63] Continuation-in-part of Ser. No. 717,835, Mar. 29, 1985, abandoned.

[51] Int. Cl.⁴ .............................................. H04N 5/78
[52] U.S. Cl. .................................. 360/33.1; 358/102; 358/335; 360/92; 194/217
[58] Field of Search ............... 360/15, 33.1, 55, 92, 360/69; 358/335, 102; 364/410, 521, 479, 478; 369/84, 85, 30, 34, 35

[56] References Cited

U.S. PATENT DOCUMENTS

| | | | |
|---|---|---|---|
| 2,318,118 | 5/1943 | Warner et al. | 369/52 |
| 3,646,258 | 2/1972 | Lemelson | 358/102 |
| 3,718,906 | 2/1973 | Lightner | 340/147 |
| 3,810,239 | 5/1974 | Kozu et al. | 360/92 |
| 3,990,710 | 11/1976 | Hughes | 194/15 |
| 4,063,294 | 12/1977 | Burkhart | 360/92 |
| 4,108,365 | 8/1978 | Hughes | 235/419 |
| 4,141,095 | 2/1979 | Sheehan | 360/15 |
| 4,224,644 | 9/1980 | Lewis et al. | 360/72.2 |
| 4,287,541 | 9/1981 | Tanahashi et al. | 360/92 |
| 4,361,858 | 11/1982 | Chambers | 360/92 |
| 4,527,262 | 7/1985 | Manto | 369/33 |
| 4,647,989 | 3/1987 | Geddes | 360/55 |
| 4,654,727 | 3/1987 | Blum et al. | 360/71 |
| 4,667,802 | 5/1987 | Verduin et al. | 364/410 |
| 4,672,554 | 6/1987 | Ogaki | 364/410 |
| 4,688,015 | 8/1987 | Bloch et al. | 358/335 |

FOREIGN PATENT DOCUMENTS 2013865  2/1983  United Kingdom ................. 360/15

OTHER PUBLICATIONS

"Tell Grandma 'Hi' by Video", *Entrepreneur*, Jun. 1986, p. 19.
Vol. VI, No. 12, "Video" magazine, Mar. 1983, p. 22.

*Primary Examiner*—Donald McElheny, Jr.
*Attorney, Agent, or Firm*—Heslin & Rothenberg

[57] ABSTRACT

A vending system which allows a customer to record a personal message on a blank video cassette tape or view and inserted prerecorded video cassette tape is disclosed. The system includes a payment detection mechanism, an activation means responsive to the payment detection mechanism, a video recording and/or viewing device and an ejection mechanism for ejecting a recorded video cassette tape. A booth surrounding the vending system is provided for customer privacy while recording or viewing a tape.

15 Claims, 8 Drawing Sheets

VIDEO CASSETTE RECORDING AND/OR VIEWING VENDING SYSTEM

CROSS-REFERENCE TO RELATED APPLICATION

This application is a continuation-in-part of copending application, Ser. No. 717,835, filed Mar. 29, 1985 abandoned.

BACKGROUND OF THE INVENTION

The present invention relates in general to video cassette recording and viewing apparatus, and more particularly, to a vending system for video and audio recording of a customer's personal information on a blank cassette tape and/or playing a prerecorded video cassette tape for customer viewing.

The growth of personal video cassette recorders over recent years has been phenomenal and needs no documentation. A video cassette recorder allows an individual to electronically record television programs for later playback, view purchased or rented prerecorded video cassettes, and/or view video cassettes recorded using a personal video camera. It is this last option to which the present invention principally relates.

Recording personal information or messages on video cassette tape has the potential to quickly become a powerful new medium of communication or correspondence. Possible uses for personally recorded video cassette tapes include sending of video taped greetings to distant friends and relatives, recording of information for matchmaking and dating services, recording of video yearbooks in high schools and colleges, or documenting ownership, e.g., for an insurance company, etc. A principal limiting factor on the general population's ability to take advantage of this new medium of communication is the cost of purchasing a personal video camera. Although commercially available to all, video cameras are expensive and therefore primarily purchased by wealthy individuals and organizations.

Following the early marketing success of video cameras, and recognizing the tremendous potential for video communication, a few entrepreneurs opened businesses offering video recording services. These businesses, which essentially consist of a manned video taping facility, are based upon the principal that while the sale of lower priced video cassette recorders is strong, the sale of the more expensive video cameras remains weak. Thus, capitalizing upon this difference these businesses are able to charge a relatively high price for their services. In addition to being expensive, such video taping facilities have the undesirable aspect that customer's personal information is not recorded in complete privacy, due to the presence of the camera operator.

Another limit on the potential growth of video communication via cassette tapes is that some individuals are unable to afford even a video cassette recorder or player. If such individuals are to view information recorded on a video cassette tape, they must either rent a cassette recorder or player, which can be expensive, or borrow one from another person, which often may be inconvenient for both parties involved Therefore, there presently exists a genuine need for a vending type video recording and/or viewing system which, for an inexpensive charge, allows a customer to ettther record personal information on video cassette tape or view a previously recorded video cassette tape.

SUMMARY OF THE INVENTION

Accordingly, a principal object of the present invention is to provide a vending system for recording personal information and messages on blank video cassette tape.

Another object of the present invention is to provide a vending system for playing a customer provided video cassette tape for viewing.

Yet another object of the present invention is to provide a video recording and/or viewing vending system which is fully automated yet easy to repair.

A further object of the present invention is to provide a video recording and/or viewing vending system which is simple and inexpensive to use.

It is yet a further object of the present invention to provide an automated vending system for playing a video cassette tape selected by the customer from a plurality of stored, prerecorded cassette tapes.

The present invention satisfies these objects by providing an automated vending system for recording personal customer information on video cassette tape. The automated vending system has a payment detection mechanism for verifying that a customer has paid in a prescribed amount, an activation means responsive to the payment detection mechanism for providing an activation signal upon receipt of proper payment, a video recording device responsive to the activation signal for taping a customer's personal information on a video cassette tape, and an ejection mechanism for ejecting the video cassette tape after personal information has been recorded thereon for permanent retention and use by the customer.

In addition, the automated vending system preferrably is capable of accepting and playing a previously recorded video cassette tape for customer viewing. In this embodiment, a first or second activation signal is generated by the activation means in response to payment of a first or second prescribed amount. One of the first and second activation signals serves to activate the record mode and the other to activate the playback mode.

The present invention further satisfies the above objects by providing an automated vending system for customer selection and viewing of stored prerecorded video cassette tapes. This selection and viewing system has a payment detection mechanism for verifying that a customer has paid in a prescribed amount, an activation mechanism responsive to the payment detection mechanism for providing an activation signal upon receipt of proper payment, and video cassette selection and viewing means responsive to the activation signal for customer viewing of a desired prerecorded video cassette tape.

BRIEF DESCRIPTION OF THE DRAWINGS

While the specification concludes with claims particularly pointing out and distinctly claiming the present invention, the objects, features and advantages of the present invention can be more readily ascertained from the following detailed description of one preferred embodiment when read in conjunction with the accompanying drawings in which:

DETAILED DESCRIPTION OF THE INVENTION

Figure 1:
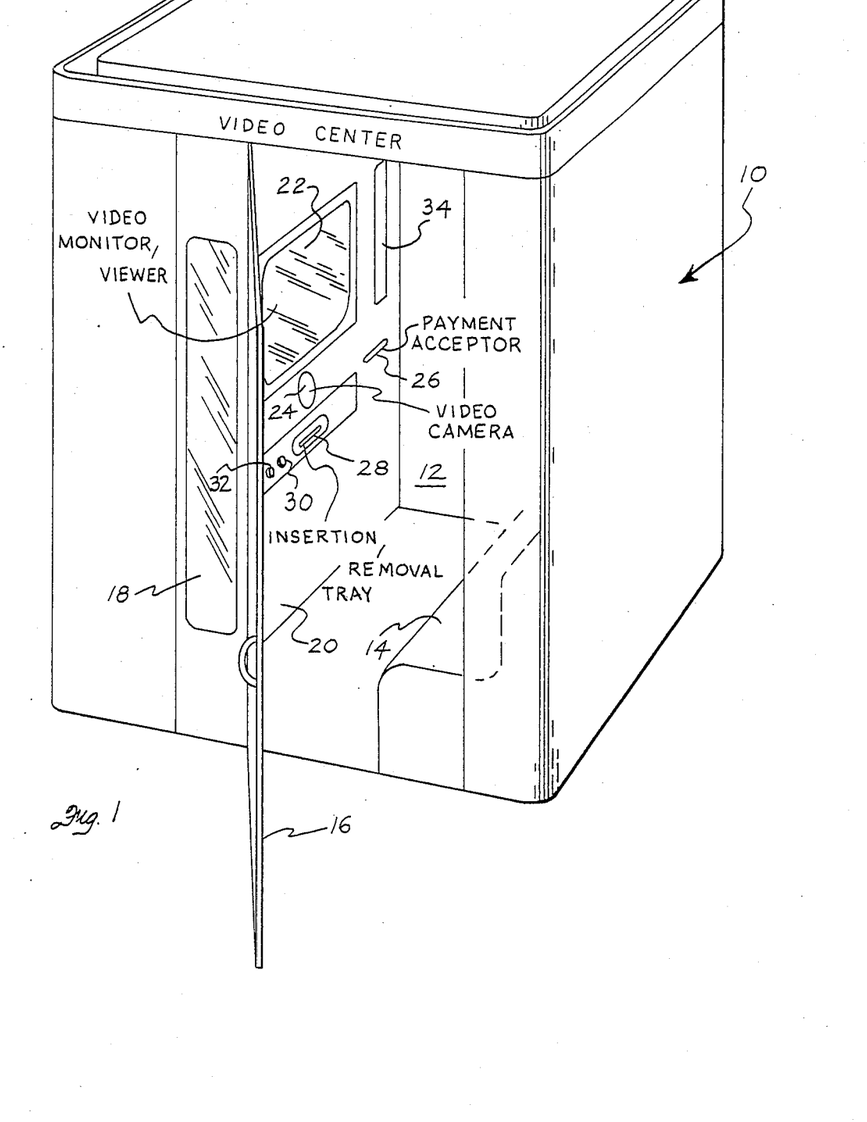
FIG. 1 is a perspective view of a booth with the automated vending system of the present invention located therein.

The automated vending system of the present invention is shown in FIG. 1 as preferably being located within a booth 10. Booth 10 provides an enclosed space 12 for customer privacy during recording of a personal message or information on blank video cassette tape and/or viewing of video cassette tape containing such information. Obviously, the shape, size and appearance of booth 10 may vary so long as it defines enclosed space 12 for customer privacy. Booth 10 is preferably constructed of lightweight materials and collapsible to facilitate relocation if desired. Enclosed space 12 has a seating structure 14 for customer comfort while recording or viewing a tape. Background noise is reduced or completely eliminated by door 16 when in a closed position. A window 18 is provided near the automated vending system components, discussed below, to provide a view thereof and thereby hinder tampering.

The mechanisms of the automated vending system are located behind a panel 20, with only necessary components interfacing with the customer. These components include: the screen 22 of a video monitor/viewer, the lens 24 of a video camera, a slot 26 for customer insertion of proper payment, and a slidable tray 28 for customer retrieval of a recorded video cassette tape. In addition, certain buttons may be provided such as a system activation button 30, to initiate recording or playing of a video cassette tape after payment of a prescribed amount has been verified, and a stop record or stop playback button 32 for customer discontinuance of either a recording or viewing operation. Lights 34 for illumination of enclosed space 12 are also provided on panel 20.

The general functioning of the vending system will now be described with reference to FIG. 2. Initially, a payment acceptor/validator mechanism 40 determines whether payment in a prescribed amount and manner, e.g., whether by money or credit card, has been received. The prescribed amount and manner of payment is preprogrammed and system directions are provided for customer use and proper payment. Preferably, payment mechanism 40 is programmed to recognize two different acceptable payment values corresponding to the two primary functions of the system, recording and viewing. Upon receipt of proper payment, and dependent upon the value of the payment received, payment mechanism 40 outputs either a first or a second signal to computer controller 42 to initiate one of the two vending system operations. By appropriate design, activation of the record or play mode may be either manual, e.g. by requiring the customer to press button 30 (FIG. 1), or automatic with receipt of a proper signal from payment acceptor/validator mechanism 40. (Manual activation of the record or play mode is necessary if payment acceptor/validator mechanism 40 is programmed to only recognize one acceptable payment value, i.e., where the charge to either record or playback a tape is the same.) Upon record or play mode activation, computer controller 42 controls, with appropriate feedback, system operation by selectively signaling video cassette recorder/player (VCR/P) 44, video camera 46, video monitor/viewer 48, VCR/P tape loading mechanism 50, VCR/P cover closing mechanism 52, VCR/P tape unloading mechanism 54 and cassette tape removal tray 56.

Figure 2:
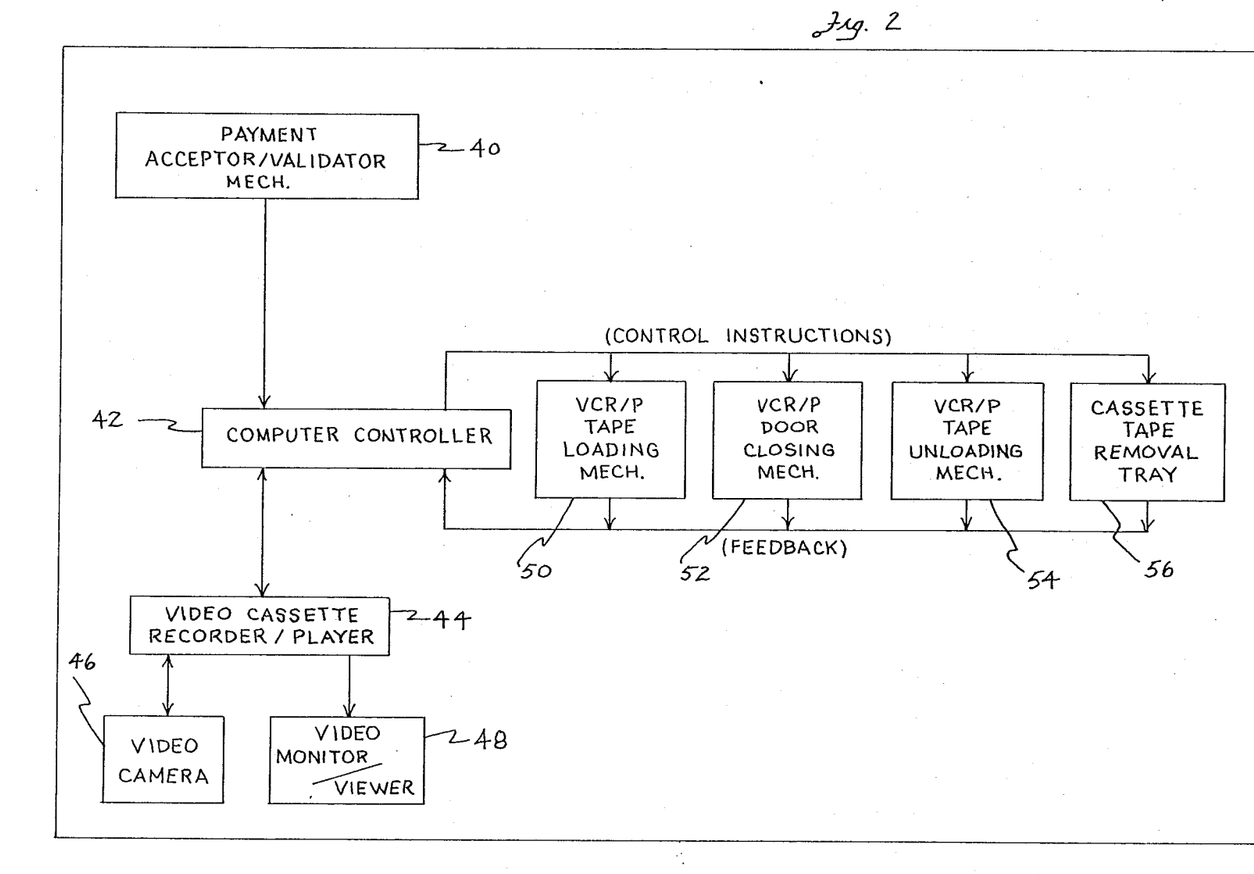
FIG. 2 is a block diagram representation of the principal components of the present invention.
Figure 3:
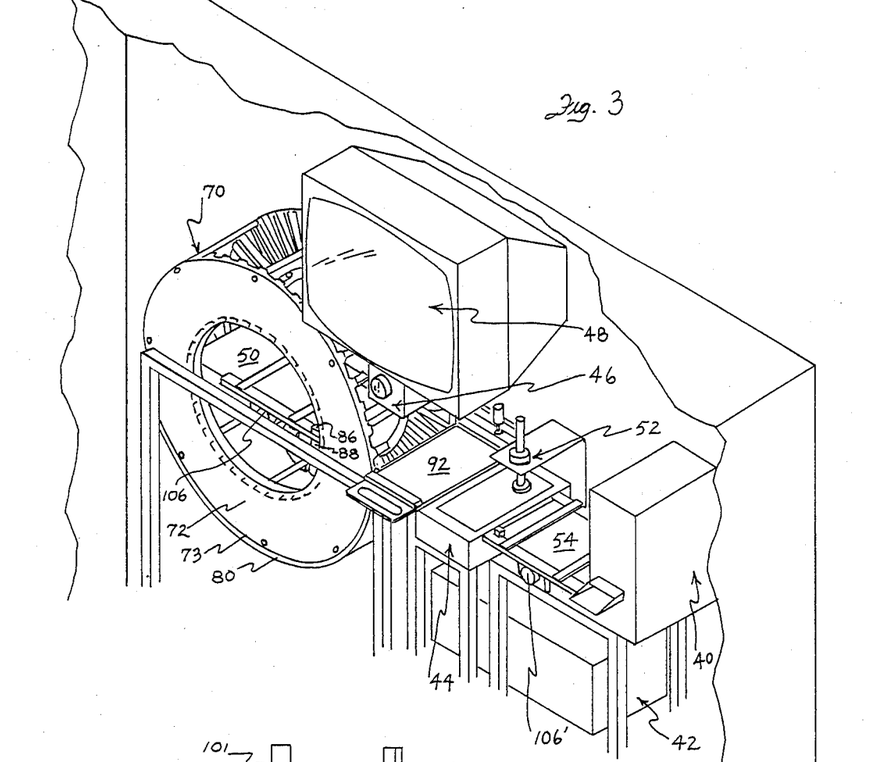
FIG. 3 is a perspective view of the principal components of the present invention represented in FIG. 2.

The assemblies represented in FIG. 2 are shown perspectively in FIG. 3. Payment acceptor/validator mechanism 40 is a component generally available in the vending system art, being manufactured by a number of companies, such as Rowe International, Model No. OBA-4. This type of payment acceptor/validator mechanism is preferable since it provides a different signal for each payment received corresponding to one of a plurality of acceptable values; for example, a first signal could be outputted upon receipt of a $10 payment, to initiate the record mode, and a second different signal could be outputted upon receipt of a $1 bill, to initiate the play mode. (The use of "first" and "second" labels are merely for purposes of description and are not intended to be a limitation on the scope of the attached claims.) As noted above, these signals may or may not be system activation signals. Computer controller 42, shown as a box below other system components, is preferably located near each of the subassemblies to provide a compact vending system and facilitate electrical connections.

Video cassette recorder/player 44, video camera 46, video monitor/viewer 48, and lights 34 (FIG. 1) are powered by a standard 110 VAC outlet (not shown). Computer controller 42, discussed in detail below, requires a 5 VDC supply (not shown) and a ±12 VDC supply (not shown) to operate. The 12 VDC supply also powers VCR/P loading mechanism 50, VCR/P cover closing mechanism 52, and VCR/P tape unloading mechanism 54. Suitable 5 V and 12 VDC power supplies are manufactured by Standard Power and marketed as Model Nos. SPS-60-A and 12V-SPS-30B-12-H, respectively.

Video camera 46 and video monitor/viewer 48 are essential to the recording and playing functions, respectively, of the present invention. In addition, video monitor/viewer 48 is used to provide a customer with visual feedback of information being recorded to ensure a proper recording. Video camera 46 and video monitor/viewer 48 are each standard items readily available in the marketplace. For example, a suitable camera 46 is manufactured by Quasar and marketed under Model No. VK 704 XE and a suitable monitor/viewer 48 is manufactured by RCA and marketed under Model No. RCA-XL-100. Video camera 46 is connected to computer controller 42 with the aid of a common micro-mini jack (not shown) which essentially allows controller 42 to control those features of video camera 46 normally requiring manual activation, such as a record trigger.

Figure 4:
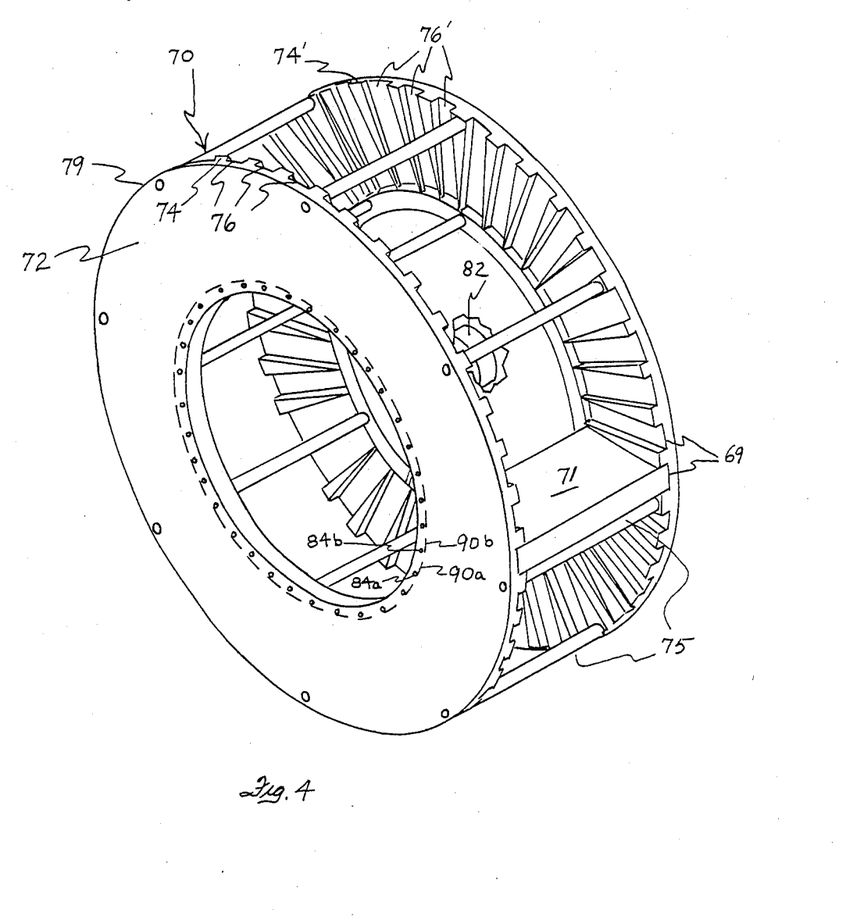
FIG. 4 is an enlarged perspective view of the rotatable drum illustrated in FIG. 3.

In the preferred embodiment, the vending system has a storage mechanism, generally denoted 70, for holding blank video cassette tapes (each blank video cassette tape preferably having a recording length substantially equivalent to a predefined record mode duration interval set by the vending system owner). As shown in FIG. 4, storage mechanism 70 includes a rotatable drum 72 designed to hold a plurality of blank video cassette tapes 71 in storage units or slots 69. Drum 72 is constructed of two identical disks 74 and 74' manufactured of a lightweight material such as aluminum--or a rigid plastic. Pairs of opposed corresponding slots 76 and 76' are cut or routed into each disk 74 and 74', respectively, to cooperate to form storage units 69 when the disks are fixedly positioned relative to each other by rods 75. Video cassette tapes 71 are preferably loosely held within slots 69 to facilitate removal of a tape when the vending system is activated to the record mode.

A C-shaped retainer 80 in close proximity to the edge 73 of rotatable drum 72 retains loosely held blank video cassette tapes 71 within slots 69 when drum 72 is rotated such that tapes are facing a downward direction (see FIG. 3). A motor 82 controlled by computer controller 42, rotates and maintains drum 72 in a desired, preprogrammed position. In the embodiment illustrated, motor 82 is a commercially available 12 volt stepping motor, e.g., AirPax manufactures and markets such a motor as Model No. K-82845-P2.

Holes 84a, 84b, etc., provided in disk 74 of drum 72, cooperate with an optical position/limit switch 86 (see FIG. 3) to provide computer controller 42 with position feedback on the storage units in drum 72, thereby facilitating proper aligning and removal of blank video cassette tapes from the drum. Position/limit switches are commercially available and manufactured by a number of companies, e.g., Honeywell manufactures an infrared diode position/limit switch, Model No. HOA-1877-2, which may be used in the present invention. A second series of holes 90a, 90b, etc., also provided in disk 74 of drum 72, cooperate with a second position switch 88 to provide computer controller 42 with feedback on the address or location of the particular tape being dispensed. Each hole 90a, 90b, etc. in this second series actually consists of a distinct pattern of holes and nonholes in a six position configuration, which allows up to sixty four slots 69 to be individually addressed. In the embodiment discussed, this feedback information is used to allow the system to provide an indication of the number of tapes remaining in storage mechanism 70, e.g., with a modem and the appropriate programming by one or ordinary skill, computer controller 42 could respond to an owner's telephone call with a digital or analog indication of the number of blank tapes left to be dispensed. The six position configuration of each hole 90a, 90b, etc., however, is primarily needed to address, for customer selection, prerecorded tapes stored in slots 69 of drum 72. This possibility and alternate system embodiment are discussed further below.

Video cassette recorder/player tape loading mechanism 50 is positioned within tape storage mechanism 70. In the record mode, loading mechanism 50 functions to move a blank video cassette tape from storage mechanism 70 across the flat support surface 92 cassette tape removal tray 56 into video cassette recorder/player 44. After loading, video cassette recorder/player cover closing mechanism 52 is activated to press video cassette recorder/player cover 94 closed.

Figure 5:
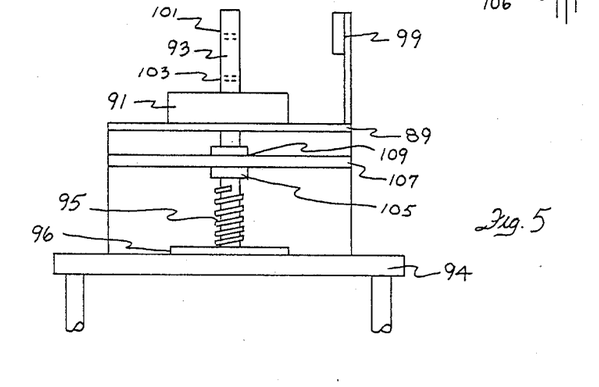
FIG. 5 is an enlarged perspective view of the video cassette recorder/player cover closing mechanism shown in FIG. 3.

With reference to FIG. 5, cover closing mechanism 52 consists of a standard 12 volt digital linear actuated stepping motor 91, such as that manufactured by Airpax, Model No. L-92211-P2. Motor 91, secured to a frame support structure 89, has a reciprocative rod 93 which is secured at one end, via spring 95, to a disk 96. Disk 96 provides a large contact surface to better distribute downward forces being applied to a raised VCR/P cover 94. Preferably, rod 93 is keyed in a known manner to prevent rotation. For example, a rectangular member 105, secured to form a part of rod 93, is retained within an appropriately sized slot 109 formed in an arm 107 extending from frame support structure 89. A position/limit switch 99 cooperates with a first hole 101 in rod 93 to signal the completed closure of cover 94. First hole 101 is positioned such that spring 95 will be slightly compressed upon completion of the operation, thereby guaranteeing closure of cover 94. A second hole 103 is provided in rod 93 to cooperate with position/limit switch 99 to signal full retraction of cover closing mechanism 52 after completion of a VCR/P cover closing operation.

Video cassette recorder/player tape unloading mechanism 54 functions to move a recorded video cassette tape from video cassette recorder/player 44 onto flat surface 92 of cassette tape removal tray 56 after a record or play operation has been completed. Once properly positioned on tray 56, computer controller 42 releases a tray lock, discussed below, and provides an indication to the customer that the tape may be removed.

Figure 6:
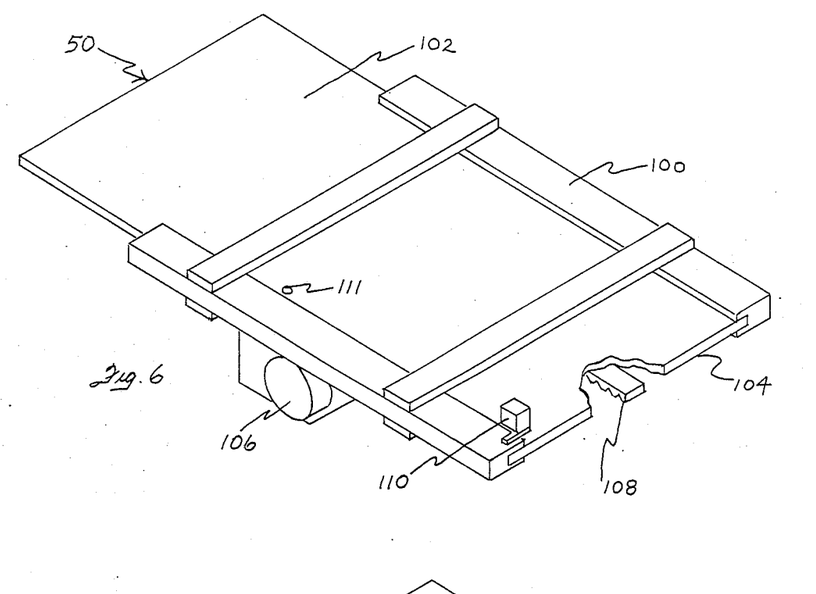
FIG. 6 is an enlarged perspective view of the video cassette tape loading mechanism shown in FIG. 3.

Structurally, loading mechanism 50 and unloading mechanism 54 are substantially identical and therefore only one will be described in detail. As shown in to FIG. 6, loading mechanism 50 is supported by a track 100. Mechanism 50 includes a flat rectangular shaped slidable plate 102 having a substantially straight front edge surface 104 for contacting a video cassette tape (not shown). A reversible stepping motor 106, such as a 12-volt stepping motor manufactured by Airpax, Model No. K-B2416-P2, provides the drive to move plate 102 in a forward or reverse direction with appropriate rack and pinion gearing to a rack 108 affixed to plate 102. Position/limit switch 110 provides feedback to computer controller 42 as to the positioning of plate 102 by sensing the presence of a first hole (not shown) and a second hole 111 in plate 102. Position/limit switch 110 senses the presence of a first hole in plate 102 when the plate is fully retracted as shown in FIG. 6 and a second hole 111 when plate 102 is fully extended, i.e. to insert a tape in video cassette recorder/player 44.

In the preferred embodiment, unloading mechanism 54 has three holes which cooperate with a position/limit switch to provide computer controller 42 with position feedback. As discussed below, a third hole is necessary since unloading mechanism 54 has two extended positions: (1) to initially clear tray 56 of a recorded tape inadvertantly left thereon or miscellaneous debris; and (2) to move a recorded tape from VCR/P 44 onto tray 56. Unloading mechanism 54 initially clears tray 56 by moving any material left thereon across flat face 92 into an empty storage unit 69 horizontally aligned across flat face 92.

As noted above and shown in FIG. 7, cassette tape removal tray 56 has a flat surface 92 over which a blank video cassette tape passes when being loaded into video cassette recorder/player 44 and onto which a recorded video cassette tape is moved after completion of a record or play operation. Once a cassette tape is moved onto flat surface 92 of tray 56 for customer removal, computer controller 42 signals to release a locking solenoid 116 and further provides an indication to the customer that the tape may be removed. Locking solenoid 116, secured to frame structure 117, cooperates with a hole (not shown) in tray 56 to assist in protecting the vending system against tampering by maintaining tray 56 in a normally locked position.

Figure 7:
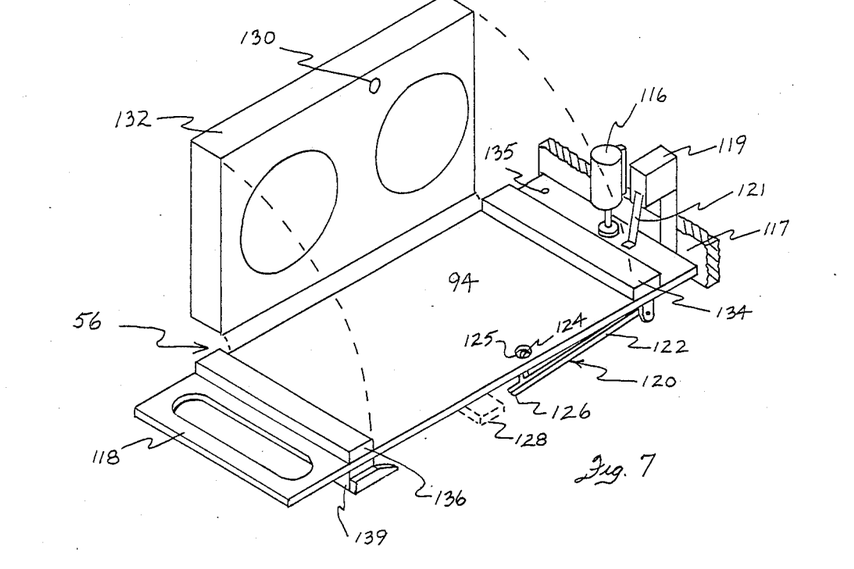
FIG. 7 is an enlarged perspective view of the slidable tray illustrated in FIG. 3.

The particular design, shape and size of tray 56 may vary depending upon the size or format of the tape involved. There should be, however, a structure or mechanism to facilitate the outward sliding of tray 56 such as a handle 118. In addition, an automatic retraction mechanism 119 mounted on frame structure 117 and attached to tray 56 via a tape 121 is provided for returning tray 56 to a retracted position upon its release by a customer. A suitable retraction mechanism comprises a spring counterbalance, such as those manufactured by Pullman Mfg. Corp. Preferably, a mechanism 120 is provided to assist a customer in properly placing a recorded tape onto flat surface 92 for insertion into the vending system. Mechanism 120 consists of a spring biased arm 122 having an angled end face 126 and a cylindrical peg 124 transversely connected thereto, such that when tray 56 is pulled in an outward direction, angled front face 126 allows spring biased arm 122 to ride over a frame support member 128 (shown in phantom), and thereby force peg 124 through a hole 125 in tray 56. Mechanism 120 and hole 125 are appropriately dimensioned and positioned so that peg 124 contacts a specific hole 130 in a video cassette tape 132 of a particular format, (i.e. VHS or Beta) to thereby position the tape in the appropriate direction and prevent the insertion of an incorrectly formatted tape into the system. With the return of tray 56 to a closed position, assembly 120 pivots back to its biased position with peg 124 below flat support surface 92 of tray 56. Computer controller 42 is provided feedback on the positioning of tray 56 through a position/limit switch (not shown) which senses the presence of hole 135 in tray 56 when the tray is in a retracted position. End bars 134 and 136 further assist in properly positioning a video cassette tape on flat surface 92 when a tape is being inserted for viewing or unloaded for return to the customer. End bar 136 and lower bar 139 also function to seal the interior of the vending system around tray 56.

Figure 8:
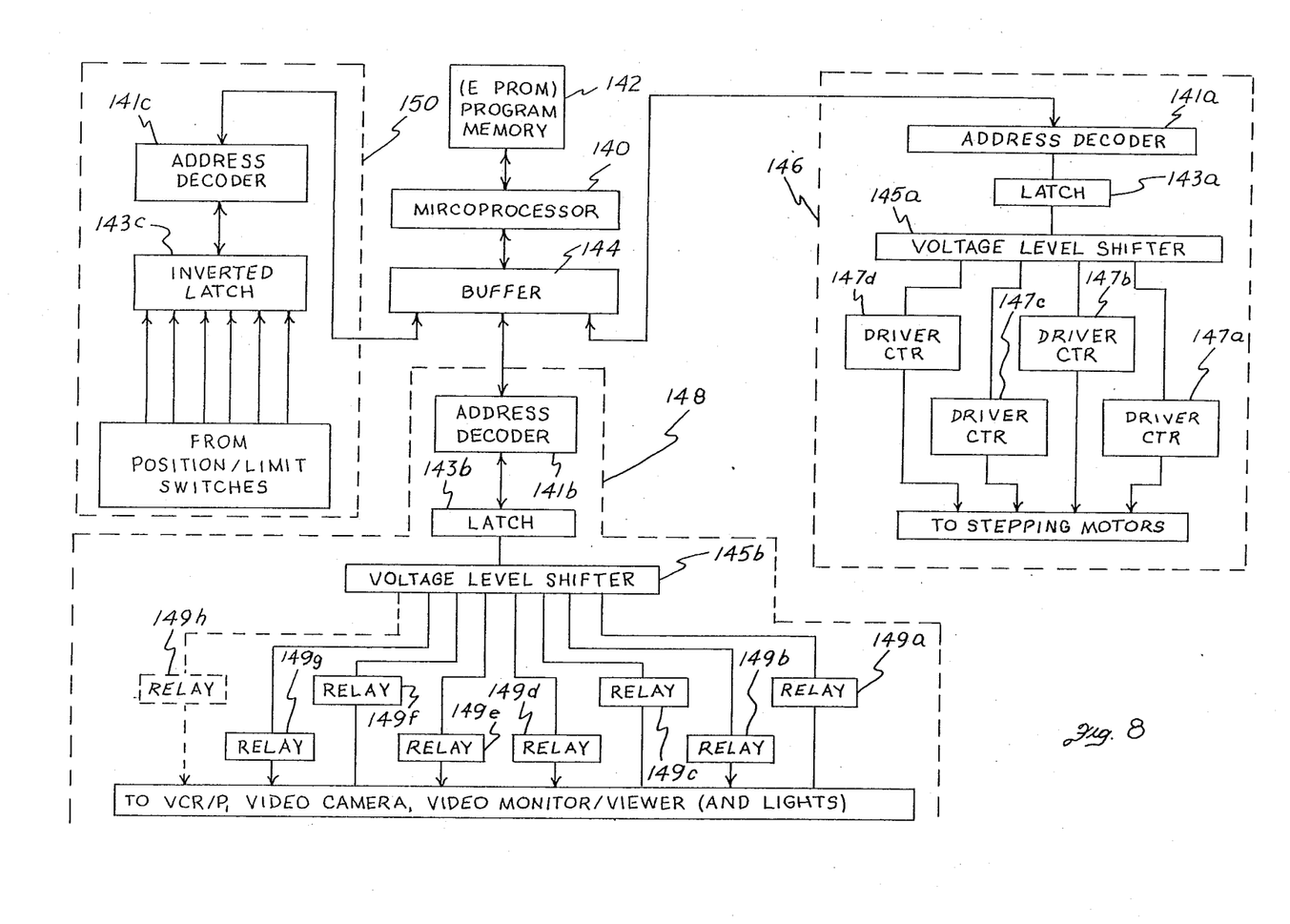
FIG. 8 is a block diagram representation of the computer controller represented in FIG. 2.

As noted previously, computer controller 42 controls vending system operation. With reference to FIG. 8, computer controller 42 includes a microprocessor 140 and an EPROM programmable memory 142 within which system programs are stored. Microprocessor 140 outputs and receives data by connection, via buffer 144, to a stepping motor control board 146, a relay control board 148 and a limit switch detector board 150. Buffer 144 allows microprocessor 140 to control input information by selectively enabling lines as information is needed. Microprocessor 140 controls the speed, direction and torque of stepping motors 82, 91, 106 and 106' (See FIGS. 3 & 4) via stepping motor control board 146. (In addition, the number of steps taken in a given direction by a stepping motor may be controlled if desired.) Relay control board 148 allows microprocessor 140 to control the various on/off and functional states of video cassette recorder/player 44, video camera 46 and video monitor/viewer 48. Limit switch detector board 150 provides input data on the position of various mechanisms discussed above based upon position/limit switch readings. There are numerous possible implementations of stepping motor control board 146, relay control board 148 and limit switch detector board 150 which one of ordinary skill in the art can design using standard components.

One preferred configuration of each board 146, 148 and 150 is shown in block diagram form in FIG. 8. Stepping motor control board 146, relay control board 148 and limit switch detection board 150 each includes an address decoder 141a, 141b, 141c, respectively, which may consist of integrated circuit types 7402 and 74LS139, for selectively addressing a particular stepping motor, relay or position/limit switch. In addition, each board 146, 148 and 150 has a latch 143a, 143b and 143c, respectively, such as integrated circuit type 74ALS574N, for holding data (from microprocessor 140 in the case of stepping motor control board 146 and relay control board 148 and to microprocessor 140 in the case of limit switch detector board 150). Stepping motor control board 146 and relay control board 148 further include a voltage level shifter 145a and 145b, respectively, integrated circuit type 7407, for raising the signals at latches 143a and 143b from a TTL level to a 12 volt level. The 12 volt level is needed in stepping motor control board 146 to operate driver controllers 147a, 147b, 147c and 147d. Driver controllers 147a, 147b, 147c and 147d, which each control a stepping motor 82, 91, 106 and 106', are manufactured by Signetics and marketed as type SAA1027. Relay control board 148 requires voltage level shifter 145b to operate seven (or possibly eight) 12 volt relays 149a, 149b, 149c, 149d, 149e, 149f, 149g (and 149h), manufactured by IDEC, model number REIV-10DC12. Through connection in a known manner the relays allow microprocessor 140 to control the on/off state of video camera 46, the stop, rewind, record, play, and eject modes of video cassette recorder/player 44 and the speaker of video monitor/viewer 48. (Additionally, an eighth relay 149h could be used to control lights 34 in booth 10 when a customer enters, his presence being sensed for example by a motion detector.) Limit switch detection board 150 continually receives and holds current values of the six position/limit switches 86, 88, 99, 110, 110' (for unloading mechanism 54), (and one not shown for sensing hole 135 of tray 56), in inverted latch 143c for reading by microprocessor 140.

Figure 9A:
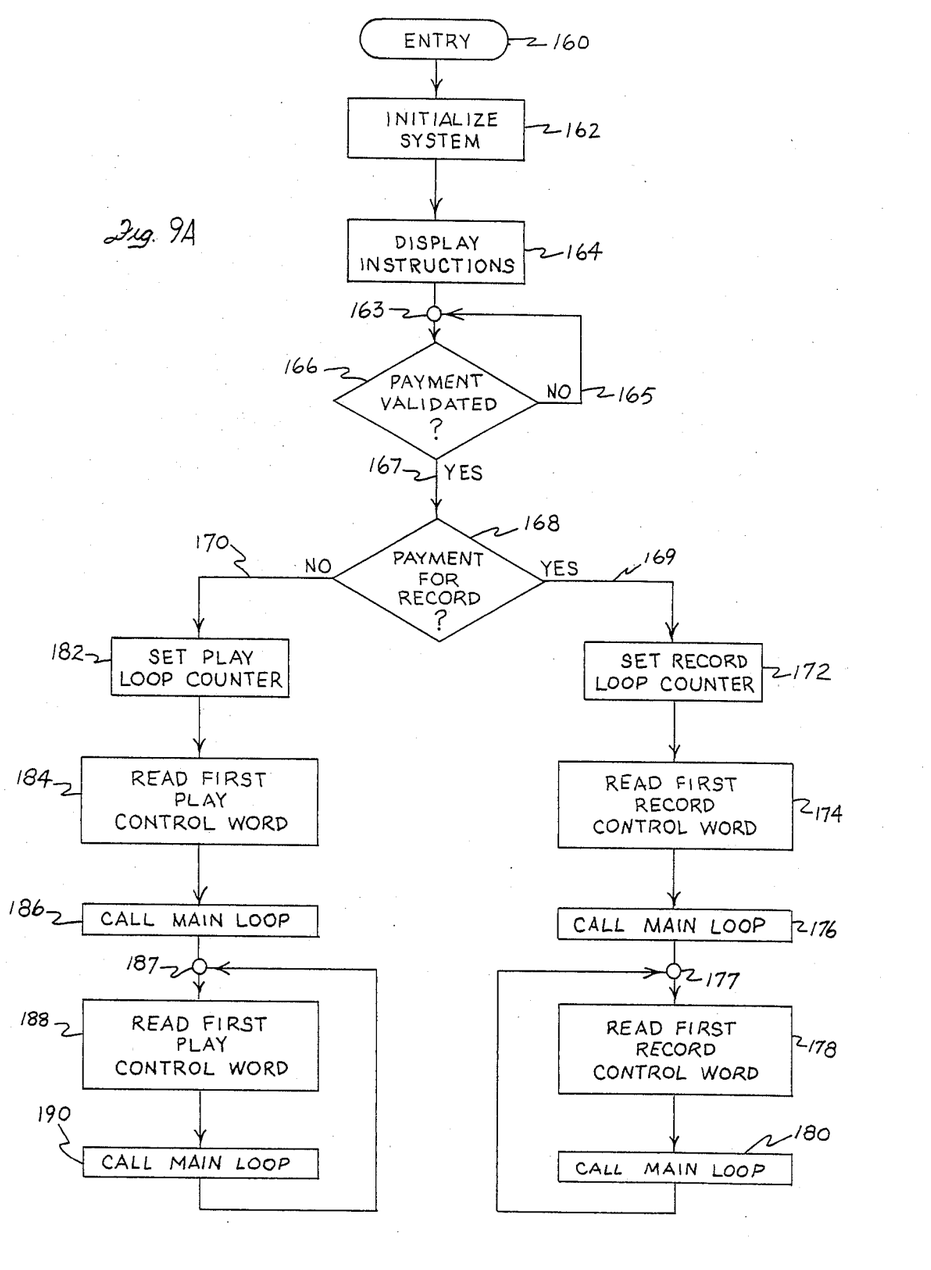
FIGS. 9a and 9b are functional flow charts of steps executed by the microprocessor of FIG. 8.
Figure 9B:
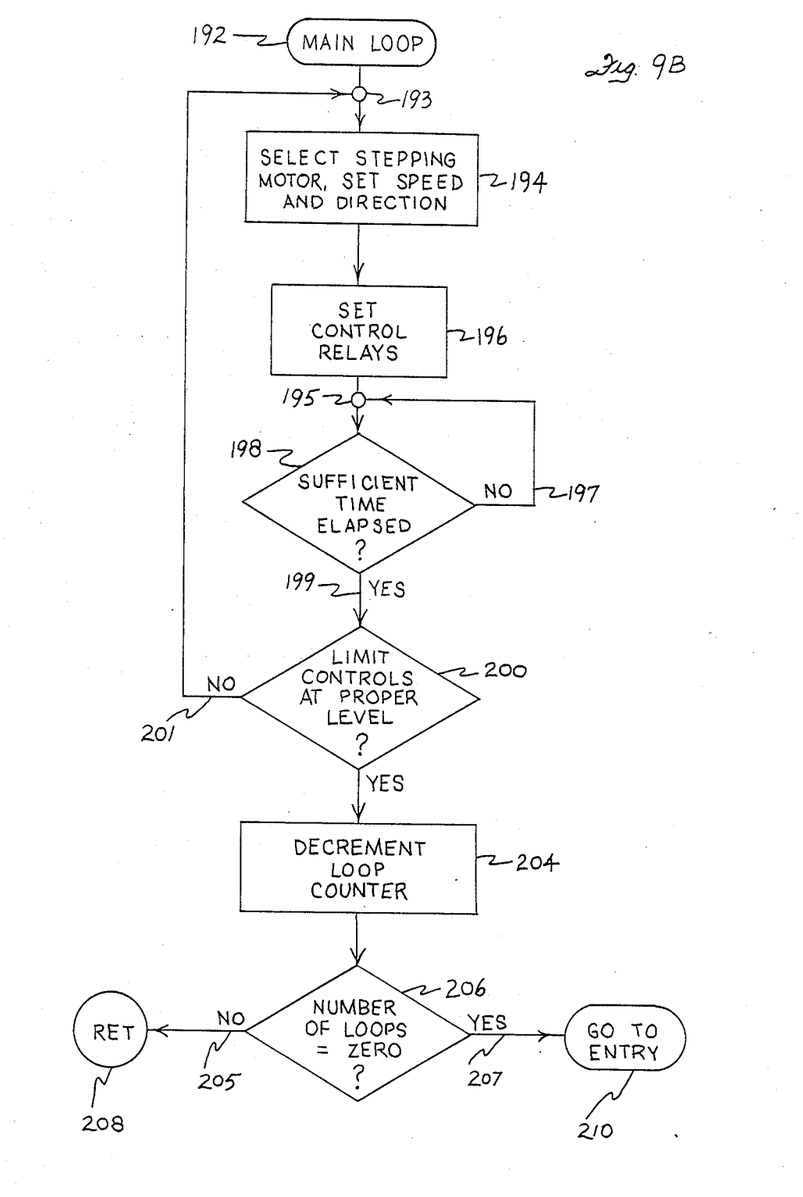

FIGS. 9A and 9B illustrate a program flow diagram for operating the vending system of the present invention. After entry at 160, flow proceeds to instruction 162 "Initialized System" which directs microprocessor 140 to initialize system registers, stepping motor speed and time and VCR/P control. After initializing the system, the processor is instructed to provide a video display of instructions for customer use of the system, 164 "Display Instructions". (Alternatively, an inquiry instruction may be inserted before 164 "Display Instructions" to require the processor to determine whether a customer is present within the booth before displaying system instructions. Any appropriate signalling device such as a motion detector or a manually activated button can be used to provide the processor with the necessary feedback.) After displaying system instructions, the processor is directed to question whether the customer has inserted proper payment, 166 "Payment Validated?". If "no", flow proceeds via 165 to junction 163 and hence to inquiry 166 "Payment Validated?" where it continues to circulate until a positive response is received. A "yes" response at 167 to inquiry 166 directs the processor to question whether the customer has paid for a record operation, 168 "Payment For Record?". If "yes", flow proceeds via 169 to instruction 172 "Set Record Loop Counter" where the number of preprogrammed loop commands for the record mode is set into a counter. From instruction 172 flow proceeds to instruction 174 "Read First Record Control Word" which directs the processor to obtain from storage the first command control word for the record operation. In the embodiment discussed below, there are eighteen control words for the record operation and eighteen slightly different control words for the playback operation. Once the processor has obtained a control word it is directed at 176 to proceed to the main operational loop, 176 "Call Main Loop".

As shown in FIG. 9B, the processor enters the main loop at 192 and proceeds through junction 193 to instruction 194 "Select Stepping Motor, Set Speed And Direction" which depending upon the control word selected, may or may not activate one of the stepping motors. From instruction 194 flow is to instruction 196 "Set Control Relays" which again based upon the control word being processed, may or may not direct the processor to activate various system components to perform a desired function. After setting the appropriate control relays, the processor is to question whether a sufficient amount of preset time has elapsed to accomplish the desired function 198 "Sufficient Time Elapsed?". If "no", flow proceeds via 197 to junction 195 where it again cycles through inquiry 198. After sufficient time has elapsed, a "yes" at 199 directs flow to inquiry 200 "Limit Controls At Proper Level?" where the processor determines whether each of the limit/position switches is at a proper level for the desired operation. In the preferred embodiment, the processor is required to sense a hole (via a limit switch) a plurality of times (e.g. twenty) in a continuous series of motor steps before recognizing that a limit control is sensing a hole and is thus at a proper level. This is done to eliminate the effects of inexact machining of holes during system construction. Similarly, the processor is preferably directed to sense a nonhole a plurality of times when stepping away from a hole before acknowledging a nonhole reading. If each of the limit/position switches is not at a proper level, flow proceeds via 201 to junction 193 where the processor again is directed through the main loop. If "yes", i.e. the operation stored under the first control word has been successfully carried out, flow proceeds to instruction 204 "Decrement Loop Counter", decrementing the loop counter previously set in instruction 172, and hence to inquiry 206 "Number Of Loops=0?" which directs the processor to determine whether the preset number of different loop commands for the given mode have been executed. If "no", flow proceeds via 205 to "Return" instruction 208 and from there to junction 177 (FIG. 9A). From junction 177 flow is to instruction 178 "Read Next Record Control Word", which directs the processor to obtain the next command control word and proceed via instruction 180 to "Call MAIN LOOP" and execute the command control word as described above.

Returning to inquiry 206, if the processor has sequentially executed the preset number of loop command control words through the main loop routine, then a "yes" at 207 directs the processor to instruction 210 "Go To Entry" where it returns to its initial state of readiness, i.e. through instructions 162 and 164 to junction 163 and waits for a customer to insert proper payment.

If a customer does not insert proper payment for the record operation, the processor would be directed at inquiry 168, via 170, to instruction 182 "Set Play Loop Counter", which directs the processor to set a counter with the predetermined number of loop commands required to execute the playback operation (since in the embodiment discussed there are only two system operations). Again, each function within the play mode is represented by a loop command control word. The processor is then directed at 184 to "Read First Play Control Word" and proceed to execute the control word in the main loop routine, 186 "Call MAIN LOOP". A "no" at 205 following inquiry 206 (i.e., the processor has not carried out the required number of steps for completion of the operation), directs the processor to junction 187. From junction 187 the next control word is obtained, 188 "Read Next Play Control Word", and executed at 190 "Call MAIN LOOP". Once all play command control words have been sequentially executed, the processor returns via instruction 210 to "Entry" 160 and eventually a state of waiting at junction 163.

The loop command control words encompass the following functional steps for the record mode: (a) stop VCR control, wait sufficient time to execute step; (b) eject VCR control, wait sufficient time to execute step; (c) activate VCR/P tape unloading mechanism (to move any tape inadvertently left in cassette tape removal tray into the storage drum); (d) check limit switch on tray to verify in locked position; (e) advance storage drum stepping motor clockwise to next cassette (the aligned cassette tape storage file will be empty from the previous record operation), and check proper drum positioning by limit/position switch; (f) read six digit cassette tape file code; (g) advance VCR/P tape loading mechanism, read limit switch to verify cassette is properly loaded in VCR/P; (h) reverse VCR/P tape loading mechanism, check limit switch to verify proper positioning; (i) activate close VCR/P cover stepping motor, read limit switch for completion of task; (j) reverse close cover stepping motor, check limit switch for completion of operation; (k) rewind VCR/P control to verify tape is fully rewound, wait sufficient time to accomplish rewind task; (1) record VCR/P control, turn video camera on, turn video monitor/viewer on with sound off (to prevent audio feedback while recording), and execute delay time to record for preset time interval; (m) set VCR/P control to stop, wait sufficient delay time to accomplish task; (n) activate eject VCR/P control, wait sufficient delay time to accomplish task; (o) advance VCR/P tape unloading mechanism, read limit switch for completion of task; (p) retract VCR/P tape unloading mechanism, read limit switch to verify proper positioning; (q) unlock cassette tape removal tray, wait sufficient time to allow customer to remove recorded cassette; (r) check limit switch for proper positioning of removal tray and lock removal tray.

The loop command control words for the play mode are essentially as outlined above except steps (e) and (f) are replaced by: (e') unlock cassette tape removal tray, wait sufficient time to allow customer to insert cassette tape; (f') check limit switch to verify tray in closed position, lock tray once closed; and step (l) is replaced by: (l') activate play VCR/P control, turn video monitor/viewer on, wait preset time to allow customer viewing.

One important alternate embodiment of the present invention consists of a vending system for viewing prerecorded video cassettes, such as movies or information tapes. The structure of the above described vending system is easily modified by one or ordinary skill to accomplish this purpose. For example, tape storage mechanism 70 would hold a plurality of prerecorded tapes. The location of each tape would be addressed by the series of holes 90a, 90b, etc. in storage drum 72 (see FIG. 4). A selection device such as a coded key pad would allow a customer to select a particular movie or informational cassette for viewing. In this embodiment, there is no need for cassette tape removal tray 56, video camera 46 or a program capable of recording personal customer information as described above. Only the playback mode is needed. A vending system having such prerecorded video cassette tapes could be positioned at various remote locations such as libraries, airport terminals and train stations.

It will be noted from the above that this invention fully meets the objectives set forth. A vending system for recording personal customer information on blank video cassette tape and/or playing a personally recorded video cassette tape for viewing is provided. The vending system is fully automated so that it is easy and inexpensive to use. Further, the vending system is easily modifiable to only play stored prerecorded video cassette tapes.

Although one embodiment has been illustrated in the accompaning drawings and described in the foregoing detailed description, it will be understood that the invention is not limited to the particular embodiment discussed but is capable of numerous rearrangements, modifications, and substitutions without departing from the scope of the invention. For example, any commercially available, standard component item such as the video camera and video monitor/viewer, may be substituted for those listed. Further, other process flow routines which accomplish substantially the same functions as those described could be written. Other changes within the scope of the invention as defined by the appended claims, will suggest themselves to those skilled in this art.

We claim:

1. An automated video center for visual and audio recording of a customer's personal message on video cassette tape, said automated video center comprising:

computer control means for sequencing and regulating video center operation;

payment detection means for verifying payment of a prescribed amount;

a rotatable drum for storing a plurality of blank video cassette tapes;

a video cassette recorder/player;

a video camera electronically connected to said video cassette recorder/player for visual and audio recording of said personal customer message on blank tape;

a video monitor/viewer electronically connected to said video cassette recorder/player for customer monitoring of his appearance while recording said personal message;

a tape insertion/removal tray, said tray being positioned between said rotatable drum and said video cassette recorder/player;

a loading mechanism for moving a blank video cassette tape from said rotatable storage drum, across said tray, and into said video cassette recorder/player in response to payment of a prescribed amount, said loading mechanism being positioned within said rotatable storage drum when said mechanism is in a retracted position;

an unloading mechanism for moving the recorded video cassette tape from said video cassette recorder/player upon completion of a recording operation onto said tape insertion/removal tray for removal and retention by the customer; and a booth defining a space for customer privacy when recording a personal message on a blank tape.

2. The automated video center of claim 1, wherein said tape insertion/removal tray includes means for insuring proper customer insertion of a prerecorded tape to be viewed.

3. The automated video center of claim 2, wherein said tape insertion/removal tray includes an automatic locking mechanism to secure said tray against tampering when in a retracted position.

4. The automated video center of claim 1, further comprising a video cassette recorder/player cover closing mechanism for closing the cover of said video cassette recorder/player after said loading mechanism has moved a blank video cassette tape or a customer inserted prerecorded video cassette tape into said video cassette recorder/player.

5. The automated video center of claim 1, further comprising encoding means on said rotatable storage drum for providing an indication of the number of blank video cassette tapes remaining in said drum.

6. The automated video center of claim 1, further comprising a window in the booth to hinder tampering, said window being positioned so as not to affect a customer's privacy when recording or viewing a tape.

7. The automatic video center of claim 1 wherein said center also provides for viewing of a customer owned and inserted prerecorded video cassette tape, and further comprising:

activation means responsive to said payment detection means for providing at least two activation signals, a first activation signal in response to payment in a first prescribed amount and a second activation signal in response to payment in a second prescribed amount;

said loading mechanism moving a blank video cassette tape from said rotatable storage drum into said video cassette recorder/player for visual and audio recording of said personal customer message in response to said first activation signal; and said loading mechanism moving a customer prerecorded tape from said tape insertion/removal tray into said video cassette recorder/player for customer viewing of said inserted prerecorded video casette tape in response to said second activation signal, whereby a customer may either record a personal message on a blank tape or view an inserted video cassette tape with an appropriate payment in the first or second prescribed amount.

8. The automated video center of claim 1, wherein said rotatable drum is constructed of two substantially identical, spaced disks interconnected by rods, each of said disks having opposed corresponding slots therein, each of said opposed corresponding slot pairs cooperating to form a single blank tape storage unit.

9. The automated video center of claim 8, wherein said storage drum is manufactured of a substantially rigid, lightweight material.

10. The automated video center of 1, wherein said loading mechanism comprises a slidable loading plate, said loading plate a having a substantially straight front edge surface for contacting video cassette tape, and forward and reverse loading plate drive means.

11. The automated video center of claim 10, wherein said unloading mechanism comprises a slidable unloading plate, said unloading plate having a substantially straight front edge surface for contacting a video cassette tape, and forward and reverse unloading plate drive means.

12. The automated video center of claim 1, wherein said center is capable of being readily disassembled and transported to a different location.

13. The automated video center of claim 1, wherein said computer control means is remotely accessible via a standard communication line to provide an indication of the number of blank video cassette tapes remaining in said storage drum.

14. The automated video center of claim 1, wherein said unloading mechanism includes means for clearing said video cassette recorder/player and said insertion/removal tray of a leftover tape or debris prior to initiation of customer recordation of a tape or customer viewing of an inserted video cassette tape.

15. The automated video center of claim 1, wherein said computer control means includes:
  program storage means;
  relay means for independently addressing and controlling said video cassette recorder/player, said video camera, and said video monitor/viewer;
  drive circuitry for controlling said loading mechanism drive means and said unloading mechanism drive means;
  feedback means for sensing the position of said rotatable drum, said loading mechanism, said tape insertion/removal tray, and said unloading mechanism; and
  a microprocessor electrically connected to said program storage means, said relay means, said driver circuitry, and said feedback means for regulating video center operation.

* * * * *